(12) United States Patent
Mitchell et al.

(10) Patent No.: US 9,785,468 B2
(45) Date of Patent: *Oct. 10, 2017

(54) FINDING RESOURCE BOTTLENECKS WITH LOW-FREQUENCY SAMPLED DATA

(75) Inventors: Nicholas Matthew Mitchell, Eldred, NY (US); Peter F. Sweeney, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 935 days.

This patent is subject to a terminal disclaimer.

(21) Appl. No.: 13/563,640

(22) Filed: Jul. 31, 2012

(65) Prior Publication Data

US 2013/0339973 A1   Dec. 19, 2013

Related U.S. Application Data (60) Provisional application No. 61/689,795, filed on Jun. 13, 2012.

(51) Int. Cl.
　　*G06F 9/50*　　(2006.01)
　　*G06F 11/34*　　(2006.01)

(52) U.S. Cl.
　　CPC ............ *G06F 9/50* (2013.01); *G06F 11/3433* (2013.01); *G06F 11/3442* (2013.01);
　　(Continued)

(58) Field of Classification Search
　　CPC .. G06F 9/50; G06F 11/3442; G06F 2209/508; G06F 11/3433; G06F 11/3452; G06F 2201/875; Y02B 60/142
　　See application file for complete search history.

(56) References Cited

U.S. PATENT DOCUMENTS 6,393,455 B1 * 5/2002 Eilert .................... G06F 9/5061
　　　　　　　　　　　　　　　　　　　　　　718/104
7,308,415 B2 * 12/2007 Kimbrel .................. G06F 9/50
　　　　　　　　　　　　　　　　　　　　　　705/7.12

(Continued)

OTHER PUBLICATIONS

Weblogic Wonders, Thread Dumps webpage, dated Oct. 4, 2011.*

(Continued)

*Primary Examiner* — Benjamin Wu
(74) *Attorney, Agent, or Firm* — Mercedes Hobson, Esq.; McGinn IP Law Group, PLLC (57) ABSTRACT

A computer program product for automatically gauging a benefit of a tuning action. The computer program product including a computer readable storage medium having computer readable program code embodied therewith. The computer readable program code including computer readable program code configured to collect a plurality of observations of a running state of a plurality of threads in a computer system. Computer readable program code configured to identify a plurality of resources of the computer system and a capacity of each resource of the plurality of resources. Computer readable program code configured to map an observation of the running state of each thread of the plurality of threads to a resource that the observation of each thread uses, respectively, and computer readable program code configured to apply the tuning action to a first resource of the plurality of resources to determine an impact on the performance of the computer system.

22 Claims, 8 Drawing Sheets

(52) U.S. Cl.
CPC .... *G06F 11/3452* (2013.01); *G06F 2201/875* (2013.01); *G06F 2209/508* (2013.01); *Y02B 60/142* (2013.01)

(56) References Cited

U.S. PATENT DOCUMENTS

| | | | | |
|---|---|---|---|---|
| 7,458,078 | B2* | 11/2008 | DeWitt, Jr. | G06F 11/3636 712/225 |
| 7,688,746 | B2 | 3/2010 | Hammarlund | G06F 9/5011 370/252 |
| 7,702,779 | B1* | 4/2010 | Gupta | G06F 9/50 709/220 |
| 7,752,623 | B1* | 7/2010 | Crawford, Jr. | G06F 9/505 718/1 |
| 8,423,534 | B2* | 4/2013 | Burger | G06F 17/30433 707/718 |
| 9,262,231 | B2* | 2/2016 | Breternitz | H04L 67/1008 |
| 9,274,838 | B2* | 3/2016 | Bairavasundaram | G06F 9/5016 |
| 9,385,963 | B1* | 7/2016 | Tobler | H04L 67/02 |
| 9,519,869 | B2* | 12/2016 | Hwang | G06N 99/005 |
| 9,542,295 | B2* | 1/2017 | Lei | G06F 9/50 |
| 2005/0028160 | A1* | 2/2005 | Cofer | G06F 9/4881 718/100 |
| 2005/0091654 | A1* | 4/2005 | Lection et al. | 718/100 |
| 2005/0240935 | A1* | 10/2005 | Ramanathan | 718/105 |
| 2006/0085854 | A1* | 4/2006 | Agrawal | G06F 21/552 726/23 |
| 2006/0130001 | A1* | 6/2006 | Beuch | G06F 11/3466 717/130 |
| 2007/0220139 | A1* | 9/2007 | Ohta | G06F 11/3409 709/224 |
| 2007/0220515 | A1* | 9/2007 | Dewitt et al. | 718/100 |
| 2012/0180053 | A1* | 7/2012 | Barsness | G06F 11/3495 718/101 |
| 2013/0024867 | A1* | 1/2013 | Glew | G06F 9/4881 718/104 |

OTHER PUBLICATIONS

United States Advisory Action dated Aug. 4, 2015 in U.S. Appl. No. 13/566,658.
United States Office Action dated Oct. 23, 2014 in U.S. Appl. No. 13/566,658.
United States Office Action dated May 13, 2015 in U.S. Appl. No. 13/566,658.
W. P. Alexander, R. F. Berry, F. E. Levine, and R. J. Urquhart. A unifying approach to performance analysis in the java environment. IBM Systems Journal, 39(1), 2000.
E. Altman, M. Arnold, R. Bordawekar, R. M. Delmonico, N. Mitchell, and P. F. Sweeney. Observations on tuning a javaenterprise application for performance and scalability. IBM Journal of Research and Development, 54(5):2:1-2:12, Sep.-Oct. 2010.
E. Altman, M. Arnold, S. Fink, and N. Mitchell. Performance analysis of idle programs. In Proceedings of the ACM international conference on Object oriented programming systems languages and applications, OOPSLA '10, pp. 739-753, New York, NY, USA, 2010. ACM.
N. Mitchell, G. Sevitsky, and H. Srinivasan. Modeling runtime behavior in framework-based applications. In Proceedings of 20th European conference on Object-Oriented Programming, ECOOP'06, pp. 429-451, Berlin, Heidelberg, 2006. Springer-Verlag.
P. Xiong, Y. Chi, S. Zhu, J. Tatemura, C. Pu, and H. HacigÖumÖuS. ActiveSLA: a profit-oriented admission control framework for database-as-a-service providers. In Proceedings of the 2nd ACM Symposium on Cloud Computing, SOCC '11, pp. 15:1-15:14, New York, NY, USA, 2011. ACM.
L. Zhu, Y. Liu, N. B. Bui, and I. Gorton. Revel8or: Model driven capacity planning tool suite. In Proceedings of the 29$^{th}$ international conference on Software Engineering, ICSE '07, pp. 797-800, Washington, DC, USA, 2007. IEEE Computer Society.
G. Xu, M. Arnold, N. Mitchell, A. Rountev, and G. Sevitsky. Go with the flow: profiling copies to find runtime bloat. In Proceedings of the 2009 ACM SIGPLAN conference on Programming language design and implementation, PLDI '09, pp. 419-430, New York, NY, USA, 2009. ACM.
L. Grinshpan. Multi-tiered applications sizing methodology based on load testing and queuing network models. In Int. CMG Conference. Computer Measurement Group, 2008.
United States Office Action dated Jan. 13, 2016 in U.S. Appl. No. 13/566,658.

* cited by examiner

FINDING RESOURCE BOTTLENECKS WITH LOW-FREQUENCY SAMPLED DATA

CROSS-REFERENCE TO RELATED APPLICATION

This application claims the benefit of U.S. Provisional Application No. 61/689,795, filed on Jun. 13, 2012.

FIELD OF THE INVENTION

The present application generally relates to a method and apparatus for finding automatically gauging a benefit of a tuning action, and more particularly to a method and apparatus for finding resource bottlenecks with snapshot data.

BACKGROUND

Making decisions about whether the performance of an application can be improved, and how to go about doing so, is a task that lies at the crossroads of code optimization and capacity planning. Typically, capacity planning systems attempt to predict performance as a function of demand for a resource versus the available capacity of the resource, e.g., based on various what-if scenarios, capacity planning systems can predict changes to response time, and throughput. Performance tuning needs the same quality of information. Indeed, some performance tuning operations reconfigure resources in exactly the way that a capacity planning exercise would simulate, e.g., adding processors or increasing network capacity.

Capacity planning techniques are quite heavy-weight, involving extensive data collection, modeling and model tuning. For instance, in a typical capacity planning exercise the user tries to fit a curve as precisely as they can. To fit the curve, the user must manually input, into the capacity planning tool, a list of available resources and the way they are interconnected, specify their queuing semantics, measure load characteristics, the set of program tasks (e.g., Servlets), and estimates of response time for each of the program tasks. Then follows a period of manipulating the inputs (often referred to as the parameter tuning or model validation), to ensure a good fit for a predictive formula. This is an extremely laborious task that is generally only performed once.

The goal of this exercise is to come up with a response time of the system for various what-if scenarios, e.g., given the manually input resources and constraints, determine that the response time of the system will be slower than if an additional resource is added. As a result, the user must baby sit the system through a period of curve fitting. In addition, this approach treats the problem as a black box and does not inform the user of how a bottleneck in the system originated.

Likewise, conventional performance tuning tools simply look for hot calling contexts. However, it is difficult to determine if calling one portion of code more than another is actually a problem. This is because performance tuning tools ignore the realities of the systems on which the code executes.

By way of example, if a resource, e.g., a CPU, is saturated and 100 threads are waiting on 4 threads to execute a database access, conventional performance tuning tools would simply attempt to increase a speed of a database access, however, this approach ignores that the CPU is saturated and will just increase pressure on the saturated CPU without improving overall performance.

That is, increasing the performance of a first operation can, and often does, cause a second operation to perform more slowly due to the fact that the second operation now has to share a resource with the first operation. This is often referred to as a zero-sum gain.

Due to the fact that conventional capacity planning and performance tuning tools evaluate changes in system performance from the various what-if scenarios based on a queuing model, they are heavily time dependent and rely on queuing theory. That is, they require simulation of the application on top of the queuing model. Therefore, these tools are not useful for identifying performance problems based on various snapshots of the system at points in time.

As a result, they carry the burden of inspecting the consequences of every change to the system to remain current. Accordingly, they carry a large burden of adapting to changes in the performance landscape of various resources. Axiomatically, conventional capacity planning and performance tuning tools are not useful for providing a lightweight solution for triaging performance problems as they arise throughout the evolution of the system.

BRIEF SUMMARY

In view of the foregoing and other exemplary problems, drawbacks, and disadvantages of the conventional methods and structures of conventional capacity planning and performance tuning tools, an exemplary feature of the present invention is to provide a method and structure in which a primary resource bottleneck can be automatically detected (found) without requiring any user defined parameters.

The method and system of the present disclosure may include identifying a primary resource bottleneck. The method and system may also include generating a queuing network model with no manual input from the user. The method and system may also include automatically figuring out where a primary resource bottleneck is located in the computer system. The method and system may include generating a set of prioritized tuning actions. The method and system may also include generating a next tuning action choice based on a determination of whether or not a tuning action is determined to be low-priority due to a latent bottleneck in the system. The system and method may include generated a plurality of queuing network models. The system and method may include generating a queuing network model for each snapshot.

A computer readable storage medium storing a program of instructions executable by a machine to perform one or more methods described herein may be provided.

Further features as well as the structure and operation of various embodiments are described in detail below with reference to the accompanying drawings. In the drawings, like reference numbers indicated identical or functionally similar elements.

BRIEF DESCRIPTION OF THE SEVERAL VIEWS OF THE DRAWINGS

The foregoing and other exemplary purposes, aspects and advantages will be better understood from the following detailed description of exemplary embodiments of the invention with reference to the drawings, in which.

DETAILED DESCRIPTION

Referring now to the drawings, and more particularly to FIGS. 1-5B, there are shown exemplary embodiments of the method and structures according to the present invention.

The system and method (also referred collectively as a methodology) in one exemplary aspect of the present disclosure may identify a primary bottleneck in a computer system without using user defined parameters. In the methodology of the present disclosure the system and method may gauge a benefit of a tuning action. In the methodology of the present disclosure, in one exemplary embodiment, generates an instance of a queuing network model from a running application and calculates an expected benefit of one or more tuning actions. Specifically, the methodology of the present disclosure in one exemplary embodiment determines the effect of one or more tuning actions on the queuing network model.

A methodology is presented in the present disclosure in an exemplary embodiment that infers behavior based on snapshots of the running application. The methodology may analyze performance effectively based on lightweight, non-intrusive snapshot information available by default, for example, from standard Java™ Virtual Machines (JVMs) and operating systems. In the methodology of the present disclosure, a snapshot of a running system comprises the call stack for every thread in the application and the lock graph; that is, what threads hold what locks and what threads are waiting on what locks. For most production JVMs (including IBM and Oracle), snapshots can be obtained from running Java applications by sending a kill-3 signal to the JVM.

Figure 1:
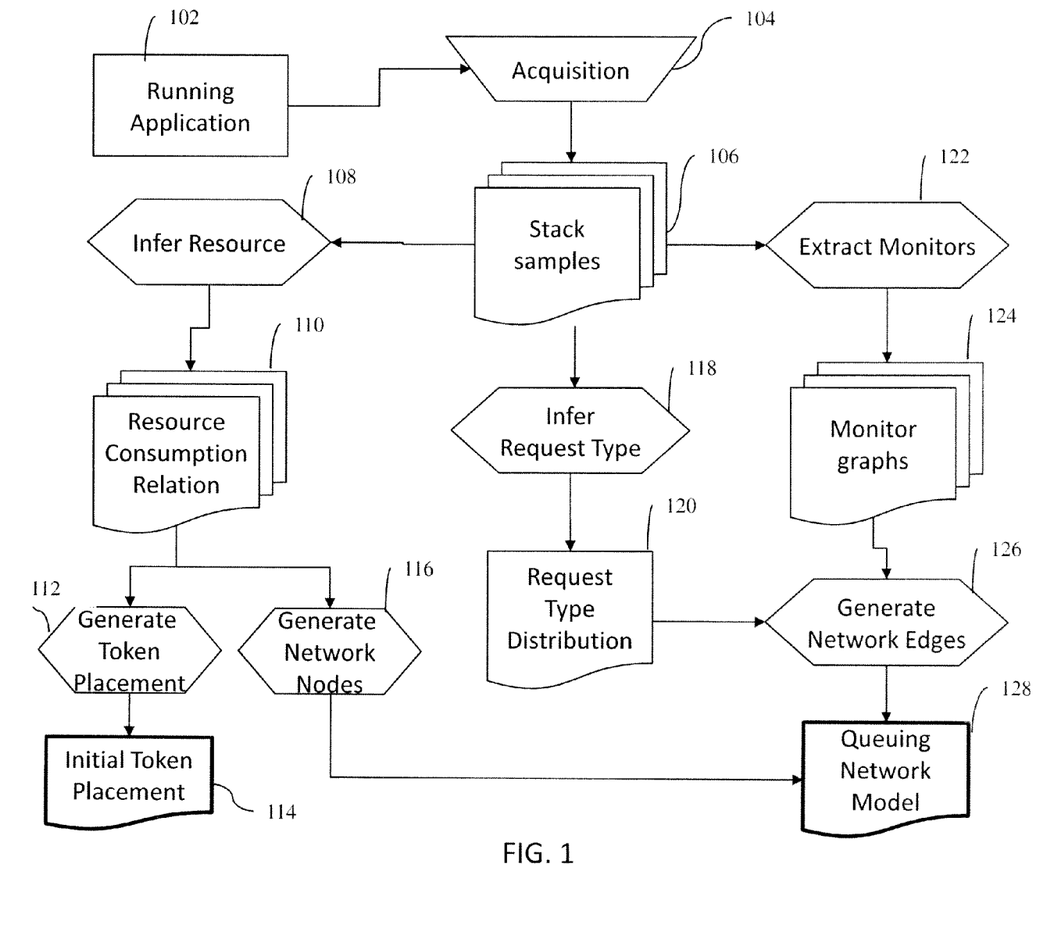
FIG. 1 illustrates an exemplary method of one embodiment of the present invention.

However, it should be understood that the methodology of the present disclosure is not limited only to snapshots. Any mechanism that aggregates the state of threads and locks is appropriate. Furthermore, the methodology of the present disclosure does not need to restart, recompile, change command line arguments to the application, change environment variables, or otherwise modify the running application, more readily allowing for wide-scale adoption of the methodology FIG. 1 illustrates an exemplary embodiment of the present disclosure. The system automatically identifies a primary bottleneck in a computer system without requiring any user defined parameters. Referring to FIG. 1, an application is running at 102. There may be a plurality of applications running in the computer system, for instance, to perform one or more desired functions. The system and method of the present disclosure need not specifically run or start an application. Rather, the system and method of the present disclosure may work from data collected about the already running application on one or more computer systems.

At step 104, snapshots of the running application may be acquired. The acquired snapshots may be referred to as stack samples 106 herein.

At step 108, hardware and software resources may be associated with the stack samples 106 acquired at step 104 to generate the Resource Consumption Relation 110.

By using snapshots, rather than more complete traces, an exemplary embodiment of the present disclosure can provide sufficient information for performance tuning, with considerably lower overhead when compared with conventional performance tuning tools. For instance, at step 104, the present methodology may acquire information about runtime execution of the computer system and running application, including but not limited to, snapshots or like system dumps.

More specifically, at step 104, the methodology of the present disclosure may acquire a snapshot of a call stack associated with each thread. The snapshot may include the current method invocation of each extant thread, at the discrete moment in time when information was collected. A plurality of these snapshots may be acquired. The plurality of snapshots may be acquired at a periodic time interval.

For example, in one exemplary embodiment the snapshots are acquired at time interval of 5 seconds. In another exemplary embodiment, the time interval may be every 30 seconds. In other exemplary embodiments the time interval may be every 15 minutes.

The snapshots may also include information about monitors, e.g., a lock graph. Briefly, monitors are programming objects that achieve synchronization in concurrent programming. Monitors are implemented such that any of its methods are executed at most by one thread at a point in time, i.e., in mutual exclusion. Further, monitors also provide a mechanism for threads to temporarily give up an exclusive access, in order to wait for some condition to be met, before regaining exclusive access and resuming their task. Monitors also have a mechanists for signaling other threads that such conditions have been met.

Monitor graphs, also referred to as lock graphs in the present disclosure, show which threads are waiting on a critical section. For example, a lock graph may include information about the current owner of a critical section of code, and the call stacks that are queued, waiting to enter that critical section of code.

The state of the threads and the lock graph at a moment in time is referred to as a snapshot in the present disclosure. Each of the call stacks in a snapshot is referred to as an observation in the present disclosure. The methodology of the present disclosure, in one exemplary embodiment, may use built-in mechanisms that are provided by most production Java™ Virtual Machine (JVM), whereby the JVM will respond to signals and dump relatively small ("javacore") files with data representing the current JVM state.

In an exemplary embodiment, at step 118, the system and method may infer a set of tasks in a program. The set of tasks in a program are referred to as the request types of that program in the present disclosure. Request types may include, for example, Servlets, work units, transaction requests, request phases. That is, request types may include the phases of a batch application, as well as, the transactions and request handlers of a server application. According to one exemplary embodiment of the present disclosure, at step 118, the request types are inferred from a set of call stack samples 106 acquired at step 104.

In an exemplary embodiment of the present disclosure a rules engine may be provided at step 118. The rules engine may detect cases of request type nesting. For example, a request type, e.g., a single Servlet, may act as a dispatcher to nested request type, rather than accomplishing a fixed task. The rules engine includes in the request type set only those wrapped units of work, and excludes request types, e.g., the Servlet, whose role is solely one of dispatcher.

At step 108, the system and method of the present disclosure may associate one or more observations with a software or hardware resource that it is attempting to consume. In an exemplary embodiment, every observation is associated with a software or hardware resource that it is attempting to consume. This association is referred to as a consumption relation in the present disclosure.

By way of example, the resources may include any number and combination of a central processing unit (CPU), locks, local data and remote data. The remote data may include multiple distinct sources of remote data, e.g., data from a database server and data from a message queuing service. One having ordinary skill in the art would understand that there may be other resources and that the remote data is not limited to the aforementioned distinct sources.

As discussed below, the system and method of the present invention may infer a resource being consumed based on the consumption relation. The system and method may infer that one resource is waiting on one or more other resources and, as a result, may infer the degree of consumption for each of the resources. Axiomatically, the consumption relation of an application can give insight into where tuning efforts should be focused.

In an exemplary embodiment, the consumption relation may also be given directly via the lock graph. In this embodiment, the observations waiting on a critical section of code and the owner of the critical section of code each take part in the consumption of that resource, e.g., a lock resource. For other resources, the consumption relation may not always be directly given. However, the consumption relation may be approximated.

For instance, managed code interacts with resources by invoking a small, and infrequently changing, set of native methods. Managed code does this in much the same way that native code interacts with operating system resources by invoking a small, and infrequently changing, set of system calls. Consequently, this periphery of native methods is small, and can be defined by a likewise small set of mapping rules. These rules relate method names to a data source or lock being consumed, and are hence likely to be idle. Conversely, threads that have no such mapping will likely be runnable, consuming a share of processor resources.

The system and method of the present disclosure may include a request type inference engine at step 118. When an observation has been assigned a request type, the request type inference engine can infer that the observation is in-request, i.e. that it is in the middle of fulfilling an instance of that request type. Since the set of native periphery methods sometimes ambiguously identifies the resource being consumed by an observation, this feature is helpful to correctly infer the consumption relation from the observations.

In contrast, a simple rule that attempts to detect idle worker threads, e.g., by looking for a combination of socketRead and Listener on the stack, often returns false positives. However, in an exemplary embodiment of the present disclosure, a consumption relation at step 110 and may exclude in-request observations from firing such simple rules, thereby achieving a large improvement in the accuracy of the consumption relation when compared to the use of simple rules alone. The method and system of the present disclosure may also use the in-request proper to infer other resource consumption states, e.g., threads wanting to join points.

The consumption relation of an application gives insight into where a tuning effort should be focused. For example, if the consumption relation indicates that a call stack is currently consuming processor resources, then a code tuning action focused on the call stack to reduce its level of CPU consumption might help. The present inventors have recognized establishing a potential function, e.g., the room for improvement of an observed level of resource consumption, is helpful in finding primary resource bottlenecks.

That is, in contrast to conventional performance tuning tools, the system and method of the present disclosure may establish a metric for improving the observed level of resource consumption. Conventional performance tuning tools, on the other hand, focus on hot methods and measure the badness of a call stack based on the number of times the stack was observed to be executing.

By accounting for the capacity of resources when identifying a primary bottleneck the resource acquisition graph of the system and method of the present disclosure may use consumes-after information in its decisions and therefore does not identify bottlenecks that would have no impact on the performance of the system.

Referring back to FIG. 1, an exemplary embodiment of the present disclosure generates network of nodes (e.g., resources) at step 116. This network of nodes is generated based on the resource consumption relation inferred at step 110.

At step 122, monitors are extracted from the stack samples 106. More specifically the lock graph information is extracted from the snapshots. Step 122 produces one or more monitor graphs 124, e.g., similar to lock graph discussed above. Monitor graphs 124 show what threads are waiting on a critical section.

At step 126, edges are generated based on the monitor graphs 124 and the request type distribution calculated at step 120.

At step 128, a queuing network model, e.g., a resource acquisition graph, is generated by combining the nodes generated at 116 and the edges generated at 126 and then inferring an instance of a queuing network model.

That is, just from the samples, the system and method of the present disclosure is able to combine the inference of the operation being performed along with the inference of the resource being consumed to automatically construct a resource acquisition graph, e.g., a performance model or a queuing network model.

In one exemplary embodiment the consumption relation is inferred from the call stacks in a sample. For each of the resources of the inferred consumption relation a node type is assigned.

Figure 2A:
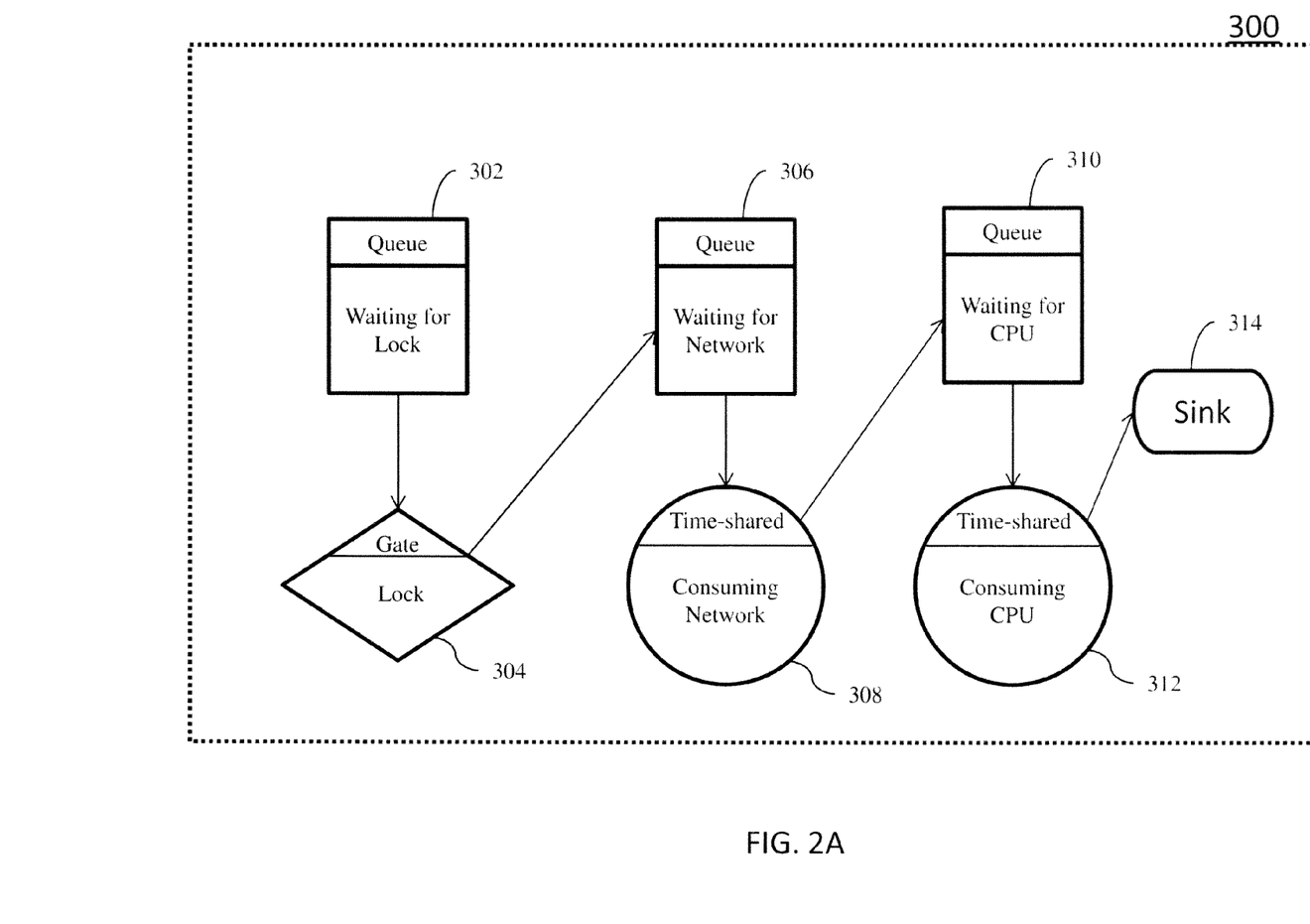
FIG. 2A illustrates an example of a consumption relation of an instance of a resource acquisition graph of an exemplary embodiment of the present disclosure.

Specifically, referring to FIG. 2A, an example of a consumption relation of an instance of a resource acquisition graph 300 is provided. The resources. e.g., 304, 308 and 312, and queues, e.g., 302, 306 and 310, are represented as nodes and the relationship between the consumption of one resource and another are represented as edges. A sink node 314 is provided for retiring consumers of the resource connected to the sink node. The sink node 314 may be connected to any of the resource nodes, however, in an exemplary embodiment the sink node 314 is connected to a CPU node 312. Clearly, the resource acquisition graph is shown for exemplary purposes and not intended to be limiting. That is, other resources and relationships thereof may be provided based on the samples.

A resource pool is a set of functionally identical or similar resources, e.g., processors that are shared between threads of computation. Each resource in the exemplary consumption relation of an instance of a resource acquisition graph 300 may have three properties. For example, a parallel capacity, e.g., a positive real number, a speed of the real number, e.g., in a range of [0, 1], and a flavor. The flavor may be either time-shared, e.g., 308 and 312, or gating, e.g., 304. Every resource has a corresponding queue, e.g., 302, 306 and 310.

The speed of a resource may affect the time to service a unit of work. For example, a 2 GHz processor may process a unit of work at most twice as fast as a 1 GHz processor. A resource with greater capacity for parallelism can complete more units of work per unit time. Of note, capacity relates to service time, e.g., capacity dictates the maximum number of concurrent consumers (tokens) that can be served without significant performance degradation.

For example, being optimistic about issues such as false sharing, a machine with 100 processors can serve as many as 100 concurrent consumers without harming the performance of any one of them. Some resource pools may have soft bounds, including, for example, a processor pool. In an exemplary embodiment of the system and method of the present disclosure, such pools have an initial, current, and maximum capacity. During execution, the runtime automatically floats the current bound between the initial and maximum bounds, based on demand. In one exemplary embodiment of the present disclosure, in such a situation the method and system may assume a maximum bound.

Each capacity bound may be based on either the economics of the situation, e.g., cost of increasing capacity, or a bound put into place to limit the degree over-consumption of some other resource pools. When, for example, a resource is saturated, e.g., more consumers than available capacity, the consumers are placed in a queue associated with that resource. That is, when interaction with a resource pool, threads of computation either consume a share of the resource or queue up until the resource becomes available.

The present disclosure provides distinct rules for time-shared resources, e.g., 308 and 312, and gating resources, e.g., 304. For instance, time-shared resources may allow for concurrent or time-shared consumption. Accordingly, time-shared resources, such as, for example, processors, network, and disks, may be multiplexed between all aspiring consumers of the time-shared resource, resulting in each consumer having a percentage of a token in the time-shared resource and the rest of the consumer represented as a token is in the queue associated with that resource.

Gating resources, on the other hand, sometimes, by design, do not allow for either concurrent or time-shared consumption. For instance, a critical section of code may not allow for concurrent execution, in order to protect against concurrent updates to certain data structures.

That is, code must have permission to access the data. In such a case of critical sections, monitors are the key or mechanism for being granted permission. Some gating resources restrict access to other resource pools. A connection pool may be a gate placed before a network resource. That is, potential consumers of that resource must first acquire permission, by reserving a connection from the connection pool. A thread pool gates access to a collection of resources, including, for example, processors, connections, and critical sections.

In other words, gating resources may not be multiplexed amongst consumers of the resource, whereas, time-shared resources may be multiplexed between all aspiring consumers of the time-shared resource. A consumer waiting for permission to pass the gate sits in the queue, idle until the completion of the critical section of the permission owner of that gating resource.

Therefore, by serving as permission to access other resources, a consumer of a gating resource may be simultaneously consuming some other resource. For instance, a consumer owning a monitor will also simultaneously be consuming (or aspiring to consume) at least one other resource, such as waiting to acquire some other monitor, or consuming a share of network or processor resources.

A sink node 314 may be provided in the system and method of the present disclosure. The sink is where a resource consumer may retire once their work is completed. By providing a sink, the present inventors have recognized that model tuning actions can result in a more rapid completion of work.

Figure 2B:
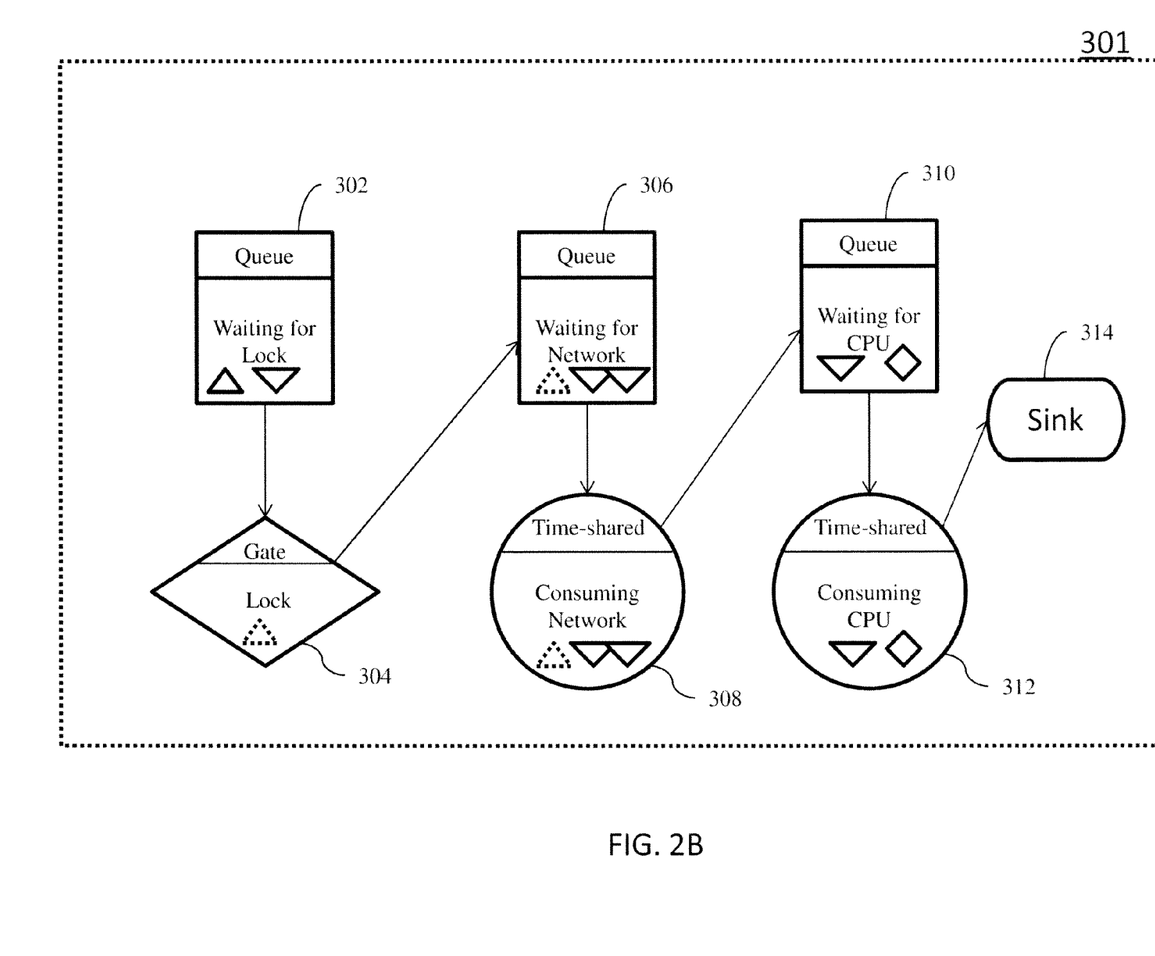
FIG. 2B illustrates the resource acquisition graph of FIG. 2A having been populated with tokens.

Referring to FIG. 2B, the resource acquisition graph is populated 301 with consumers, e.g., tokens as discussed below, of the various nodes and represents the acts of consuming, and waiting for access to a resource. Each token may have two properties: a request type, e.g., depicted as a triangle, inverted triangle and diamond in FIG. 2B, and a share, a number of the range of [0, 1].

The owner of a lock is depicted with a dashed line and is shown simultaneously consuming the lock resource 304 and a share of the network capacity 306 and 308. Tuning actions may result in a change in the distribution of resources that a request type consumes, but, the request type stays constant, e.g. by tuning, one does not change one servlet into another.

A token's share property represents a quantity of consumption of a portion of parallel capacity. A tuning action may change the share of a token. For example, the owner of a monitor is consuming the corresponding lock resource 304, whose capacity is 1, with a share of 1 the lock owner consumes the entirety of the capacity of that lock 304. The network 308 is a time-shared resource. Assuming it had a capacity of 1 and assuming that there is equal sharing, each of the three tokens would receive a one-third share of that resource.

Referring to back to FIG. 1, at step 112, the system and method of the present disclosure may generate a token placement based on the resource consumption relation calculated at step 110. The initial placement of the tokens is calculated and stored at 114. In one exemplary embodiment, given the consumption relation of step 110, step 112 creates tokens for the stack samples and whose share has a value of 1, and the token is entered into the resource acquisition graph (e.g., calculated at step 128) according to the consumption relation. Clearly high priority tokens may be given a greater weight that normal or low priority tokens.

While each token may have an initial share value of 1, the tokens will exist in proportion to their frequency of occurrence in the sample. In one exemplary embodiment, effects such as thread priorities are ignored, however, in another exemplary embodiment, effects such as thread priorities are taken into account. As discussed above, it is possible that one sample may not be representative of the overall behavior of that request type. Accordingly, it may be preferable to acquire a plurality of samples.

In addition, at step 112, the system and method of the present disclosure may populate the resource acquisition graph based on one or more invariants.

For example, a capacity constraint invariant may help to ensure that the sum of the shares of the tokens consuming a resource does not exceed the capacity of the resource. In addition, a maximal utilization invariant may allow the queue to be empty if the sum of the shares of the tokens consuming the resource is less than 1. A fairness invariant may help to ensure that the capacity of a resource is fairly shared across the request types of the tokens consuming the resource.

In order to maintain these invariants, the Generate Token Placement 512 may split or rebalance the tokens. For example, once the initial token placement is performed at step 114, time-shared resources may be saturated. To reestablish the share invariants, the system and method of the present disclosure may return to step 112 and split and rebalance the tokens to place them into the queue of the resource.

For example, assuming that K tokens have been placed in a time-shared resource with capacity C, and that the shares of these tokens are $c_1, \ldots, c_k$ and that j tokens have been placed in the corresponding queue, with shares $q_1, \ldots, q_j$. If $\Sigma\ c_i > C$, then the capacity constraint invariant does not hold. As a result, the token populating module may automatically split each of the consuming tokens $c_i$ into two tokens, each with the same request type as the original. The share of the two new tokens is then $c'_i$ and $q'_i$, the new consuming and queued shares $c'_i = C/k$, assuming that the time-shared resource will be multiplexed without bias to the consumers of the resources, $q'_i = c_i - c'_i$, i.e., the queued token may be left with the residual share. In other words, the Token Populating Module 402 moves the $q'_i$ token to the respective queue node. If, on the other hand, $\Sigma\ c_i \Sigma \square \square < \square < C$ and $j > 0$, then the maximal utilization invariant does not hold. Accordingly, the Token Populating Module 402 may reestablish the maximal utilization invariant through an analogous splitting and moving process. In such a case, the tokens will automatically flow from the queue node to the respective resource node.

As noted above, Gating resource pools the distinct property that the owner of a shared of the pool may simultaneously consume some other resource. As is shown in FIG. 2B, the token owning the gating resource 304 is also consuming other resources. This is a feature of the locked (e.g., dashed) token only, the other tokens are each distinct from the other tokens, even the tokens have the same resource type (e.g., shape). Clearly, however, there may be more than one locked token. This inter-token relationship allows the system and method of the present disclosure to more accurately model the affect of a tuning action. For example, the token in the gating resource 304 is also consuming the processing power of the network and queue 308 and 306 respectively. Therefore, increasing the speed of the code of the token in the gating resource may reduce the consumption of the time-shared resource and also allow the process in the gating resource to complete more quickly.

As noted above, a tuning action, such as adding processors or alleviating lock contention, may or may not increase performance of the system. That is, the benefit of tuning some aspect of the system depends on whether a latent performance issue will surface as a consequence of the tuning action, e.g., reducing a degree of contention for a gating resource may only increase the demand placed on a time-sharing resource. This is especially the case when the tokens of the gating resource consume a large portion of the time-shared resource.

The present inventors have realized that by acquiring snapshot samples of the execution state as a moment in time can give a resource acquisition graph (e.g., a queuing network model). A snapshot does not express any control flow properties.

The present inventors have also recognized that a consumed-after relation, which is a one-to-many correspondence between resources that indicates those resources that are likely to be consumed temporally after a given resource. In one exemplary embodiment, one consumed-after relation is considered per request type.

Since the set of resources consumed and the order in which they are used varies from one request type to the next, a global consumed-after relation that spans the entire application may overestimate the set of latent bottlenecks. Accordingly, in one exemplary embodiment of the present disclosure, the system and method may infer the consumed-after relation by observing, for each request type, the a priori distribution of resources consumed during any execution of that request.

That is, according to the present disclosure it may be inferred which resource will be consumed next by following a probability distribution given by that request type's consumption relation.

Figure 3:
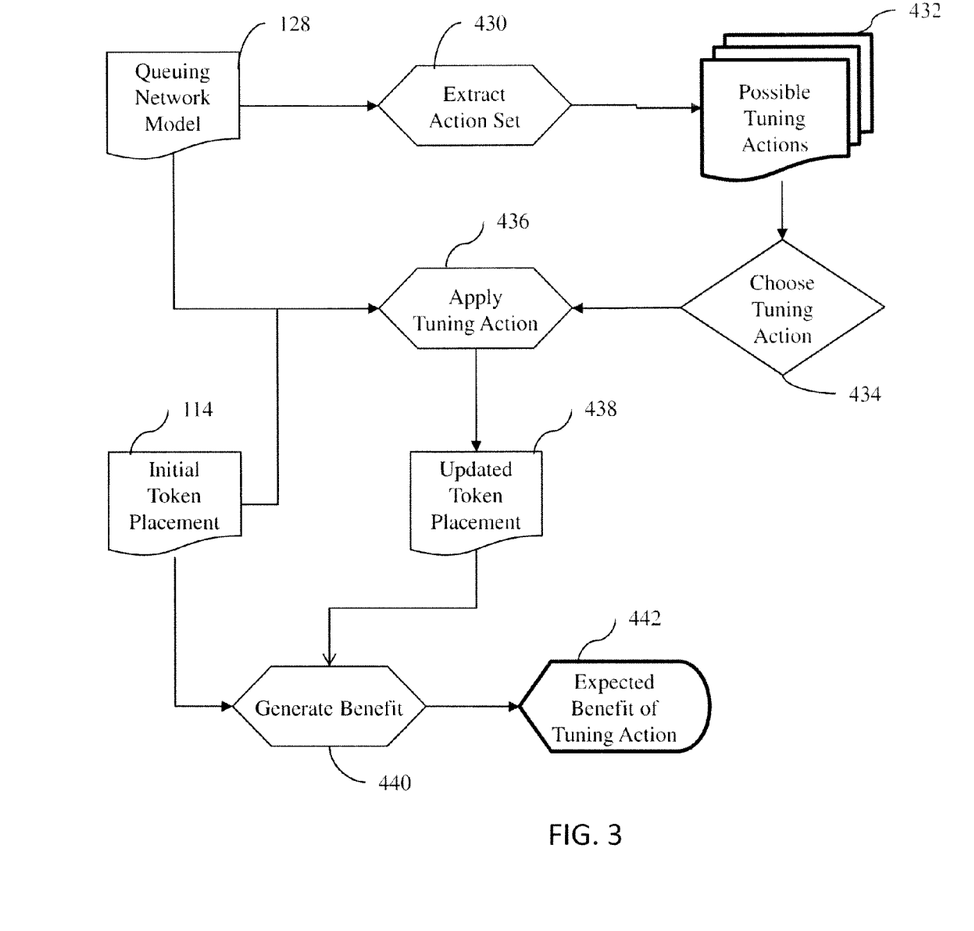
FIG. 3 illustrates an exemplary method of the embodiment of FIG. 1.

Referring to FIG. 3, in one exemplary embodiment of the present disclosure, the queuing network model generated at step 128 is provided. At step 430, a tuning action set is extracted and possible tuning actions are calculated at step 432.

At step 434, one or more tuning actions are chosen and applied at step 436 to the queuing network model 128. The chosen tuning action(s) updates the initial placement of tokens 114 in the queuing network model 128 to an updated placement of tokens 438.

The initial placement of tokens 114 and the updated placement of tokens 438 are used to generate a benefit at step 440. At step 442, the benefit generated at step 440 is used to generate an expected benefit of the applied tuning action chosen at step 434.

A potential benefit of a tuning action relates to the latency (service time, time-to-completion, or response time, etc.) of the flow of requests through the system. For batch applications, this single metric may be sufficient, and identical to the time-to-completion of the application (and any of its phases).

For server applications, request time is often of primary importance. The quality of service of a web page is often judged in this way. A second metric, throughput, is also important, but often less so. In a steady state, where requests are not backlogging, the latency of requests is only different from the rate of incoming requests if there are non-modeled upstream bottlenecks; e.g. a problem on the load driving machines, in a testing scenario.

As noted above, some conventional devices propose tuning actions that are merely a trade off increased response time in one request type for a reduction in others, even going so far as being zero sum games. The system and method of the present disclosure, however, shows how an inspection of the placement of tokens in a resource acquisition graph indicates the effect of a set of tuning actions on performance.

For example, when looking at a single sample, an application makes forward progress via the completion of requests. The only way to complete a request is by, eventually, executing code on a processor. If a thread spends forever waiting for a resource to become available (such as would be the case in a deadlock situation), response time will be infinite. Accordingly, the present inventors have realized that it may be beneficial to associate a benefit with the request type.

The system and method in an exemplary embodiment of the present disclosure can capture the effect of completing requests on performance. For example, the system and method can measure Goodness of a request type c, a reflection of the time to complete requests of that type, by considering the sum of token shares, of that request type, either consuming the resource K or as demand on the sink D, as follows:

$$\text{Goodness}(c) = K(c) + D(c)$$

At step 440, a benefit of a given tuning action may be generated by a ratio of Goodness, considered before and after applying the tuning action (e.g., the initial token placement 114 and the updated token placement 438, respectively). If Goodness'(c) is the value after tuning, then the system and method can calculate the benefit of the tuning action of the request type c as:

$$\text{Benefit}(c) = \frac{\text{Goodness}'(c)}{\text{Goodness}(c)}$$

A tuning action is beneficial with respect to request type c if Benefit (c) above a predetermined threshold and harmful if below the predetermined threshold, and otherwise considered neutral. In an exemplary embodiment, the predetermined threshold is 1.

Such a request type specific accounting exposes zero-sum gains. Some tuning actions, such as, for example, adding addition CPUs, may result in decreased resource, e.g., CPU consumption, and yet should still be considered as benefits. The system and method of the present disclosure may account for this by including in the benefit the sum of token shares that are in the sink node as a result of the tuning action.

In another exemplary embodiment of the present disclosure, the system and method of the present disclosure can compute the per-request type and net benefits across multiple samples. For example, given a set of samples and a tuning action, the system and method of the present disclosure may compute the per-request type benefit of a tuning action for each sample. To compute the per-request type benefit and net benefit across the samples, the system and method of the present disclosure may take the harmonic of the respective values. In one exemplary embodiment, the harmonic mean is used. This may exaggerate the effect of harm.

In another exemplary embodiment of the present disclosure, the system and method of the present disclosure may automatically detect a plurality of bottlenecks. In this embodiment, problems (e.g., bottlenecks) in the system may be prioritized based on where each problem is ranked according to a benefit achieved by applying a tuning action that renders the resource free.

Figure 4A:
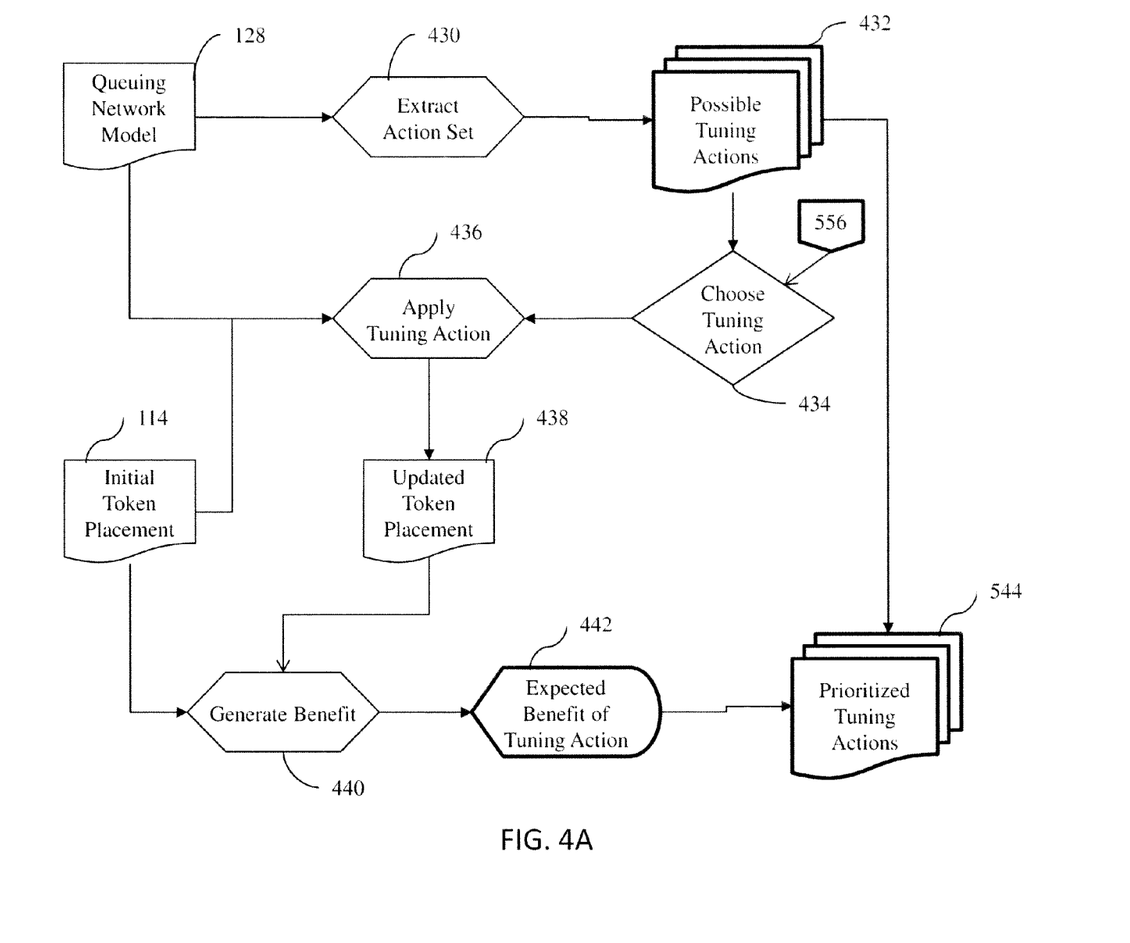
FIG. 4A, 4B illustrate another exemplary embodiment of the embodiment of FIG. 3.

For example, referring to FIG. 4A, a similar system and method to that of FIG. 3 is provided. However, in this embodiment, the tuning actions may be prioritized at step 544. When a plurality of tuning actions are chosen to be applied, the expected benefit of each tuning action is calculated at step 442 and the plurality of expected tuning benefits are prioritized at 544 based on the expected benefit of the tuning actions.

Figure 4B:
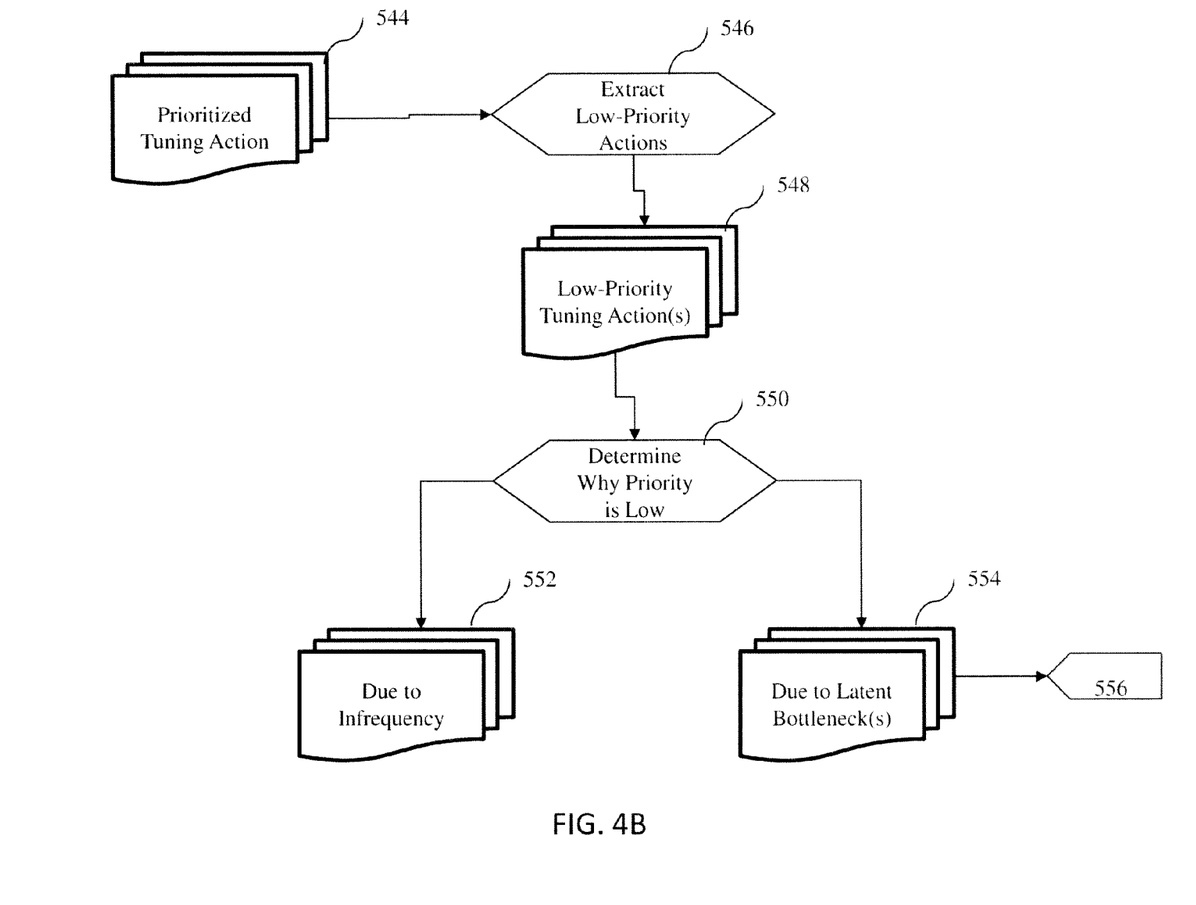

Referring to FIG. 4B, in one exemplary embodiment, one or more low-priority tuning actions may be extracted at step 546 from the set of timing actions prioritized tuning at step 544 and stored at step 548. A low-priority tuning action may be a infrequency event. In one exemplary embodiment, the one or more low-priority tuning actions stored at step 548 may be analyzed at step 550 to determine why the priority is low. If a low-priority tuning action stored at step 548 is determined to be low-priority due to infrequent event (e.g., a lock with few threads waiting on it) at step 550, then the low-priority tuning action may be classified as such at step 552.

On the other hand, if a low-priority tuning action stored at 548 is determined to be low-priority due to a latent bottleneck, then the low-priority tuning action is classified as such at step 554. This feature may be beneficial because there may be many threads affected by this tuning action; however, the tuning action may have no effect on performance. For example, if the tuning action is to remove a lock; however, the successor to the lock in the resource acquisition graph is another lock, then removing the first lock will cause all the threads waiting on that lock to wait on the successor lock.

In one exemplary embodiment, at step 556, the system and method of the present disclosure can feedback, to the choose tuning action step at 434, the low-priority tuning actions stored that have been determined to be low priority due to latent bottlenecks at step 554. This feature is beneficial because this feature may allow the system and method of the present disclosure to choose another tuning action. This process may be iterated until no more tuning actions are determined to be low-priority due to a latent bottleneck.

In another exemplary embodiment, one or more plans of action may be formed, e.g., sets of tuning actions, that together accomplish an even greater benefit may be applied to the queuing network model. For example, if lock contention is a frequent occurrence, but the system has relatively few processors, then when considering only individual tuning actions tuning the lock contention will have limited benefit on performance because of the relative few processors and tuning the processor will have limited benefit because the CPU is not fully utilized. However, when one or more plans of action are considered then the system and method may be optimized through one or more iterations of tuning until a greatest benefit is achieved.

The system and method of the present disclosure may tune one or more aspects of the system thereby resulting in a shift in the way resources are consumed by the tokens. Adding processors to the system, for example, will result in an increase in the portion that each aspiring token receives. Eliminating a source of a lock contention will result in a shift, form waiting to enter a critical section to consuming the subsequent resources, as given by the consumed-after relation.

According to an exemplary embodiment of the present disclosure, a tuning action applied at step 436 in FIG. 4A may have two consequences on the distribution of tokens. First, as a result of completing work more quickly, tokens may escape, e.g., free-up, a resource. Second, when tokens enter a time-shared resource, a token split-and-rebalance may occur as a consequence of increased demand.

A tuning action may induce at least two tokens, e.g., the escaping token and the residual token, for example, the token that flows to a subsequent resource according to consumers-after and the token that remains in the resource, respectively. Sets of the escaping token(s) and the residual token(s) can be executed for different classes of tuning actions. For example, tuning actions that change an execution speed, accomplished by changing code or the resources themselves, tuning actions that change the parallel capacity of time-shared resources, and those that introduce nascent consumers into the system.

A difference between speed increases and capacity increases lies in the shape of the performance curves. As parallel capacity is added, a linear decrease in service time, up until demand exceeds capacity may result.

In contrast, as execution speed increases, an asymptotic decrease in service time may result. There is also a commonality between speed increases and capacity increases. For example, increasing parallel capacity may also result in requests completing more quickly.

A change in processor speed or disk access time may change the latency required to accomplish a given task on that resource. Threads that would have, prior to the tuning action, been observed consuming that resource will be more likely to be observed, subsequent to tuning, consuming the resource given by the consumed-after relation. Changing the speed of a resource is an action that may affect all resource types equally.

Code tuning has a similar affect on time to completion, but is focused on individual request types of tokens. For example, tuning a particular request type to make more efficient database queries may result in decreased demand for the remote data source and increased demand for the subsequent resources. The affected tokens may be restricted to those of that request type.

Therefore, adjustments to speed can be modeled in the system and method of the present disclosure by moving tokens from one resource to one or more successor resources, according a consumed-after relationship. The system and method of the present disclosure may predict an increase in samples observed "downstream" of that resource and that predict the resulting length of the queue.

Every tuning action may have an effected set of tokens. Tuning actions that pertain to resources affect every token in that resource or that resource's associated queue, while tuning actions focused on a request type affect only tokens of that request type. Given an effected set of tokens M, the demand of M, $D_M$ is the sum of token shares, across all token in M. The demand for a resource is that $D_M$ where M consists of tokens placed there. Each resource also has a parallel capacity C.

As the speedup factor increases, the fraction of tokens escaping asymptotically approaches 1. Given a resource r, and a speed increase of factor f, the value $e_f$ representing the fraction of token shares that escape from r, is given by:

$$e_f = 1 - 1/f$$

If demand exceeds increased capacity, then the system and method may expect to see a decrease in demand proportional to the increase in capacity, gC−C. The fraction by which future observations diminish may thus given by this number divided by D. If demand does not exceed increased capacity, then the same argument holds, except that the decrease in demand is bounded by the actual demand: D−C.

The escape ratio, due to capacity increases, implies a speedup factor. The plurality of tuning actions and determine whether one or more low-priority tuning actions are low-priority due to an infrequent event or due to a latent bottleneck.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5A:
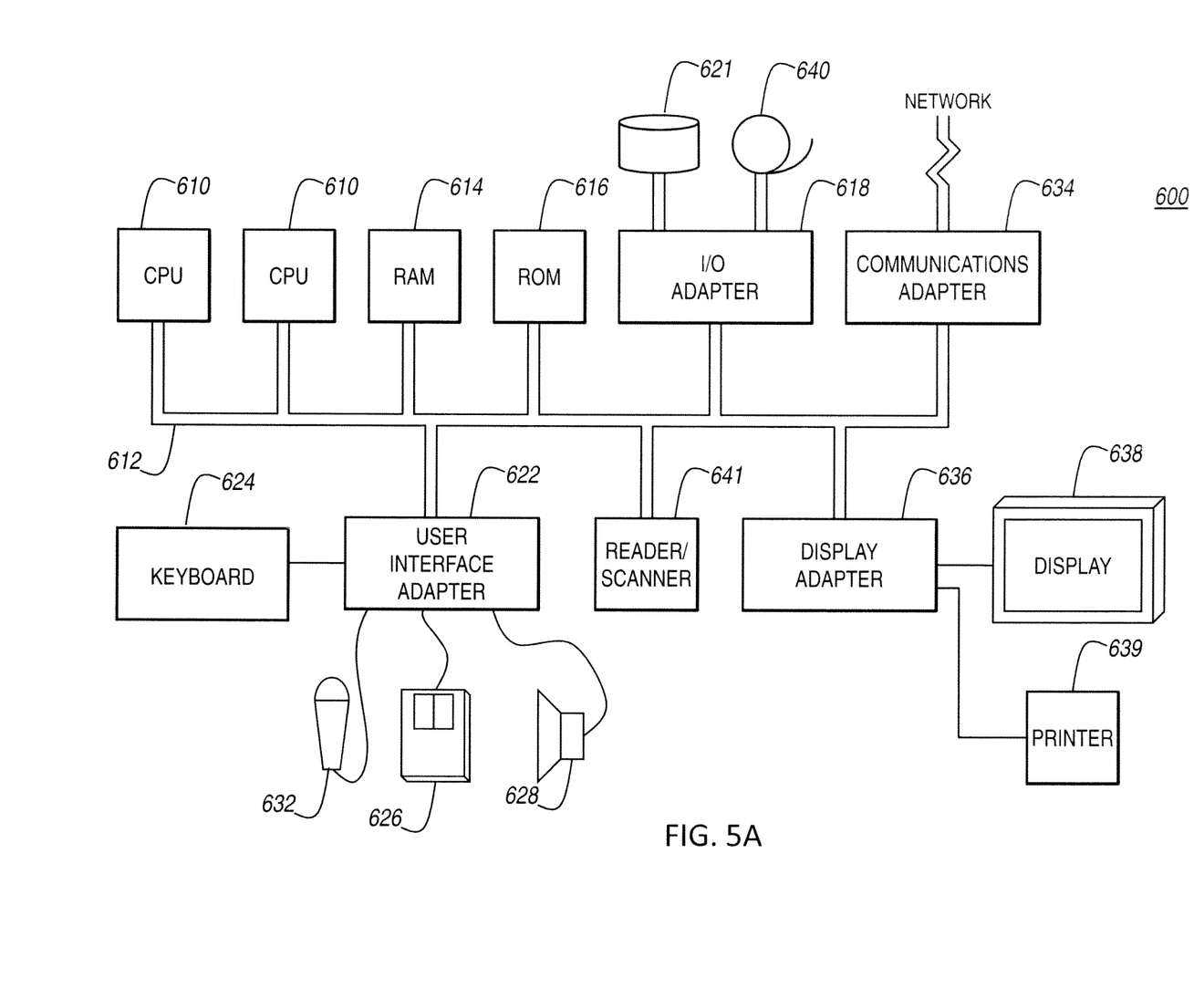
FIG. 5A, 5B illustrate a typical hardware configuration and storage media in which the systems and methodologies of the present disclosure may be carried out or executed.
Figure 5B:
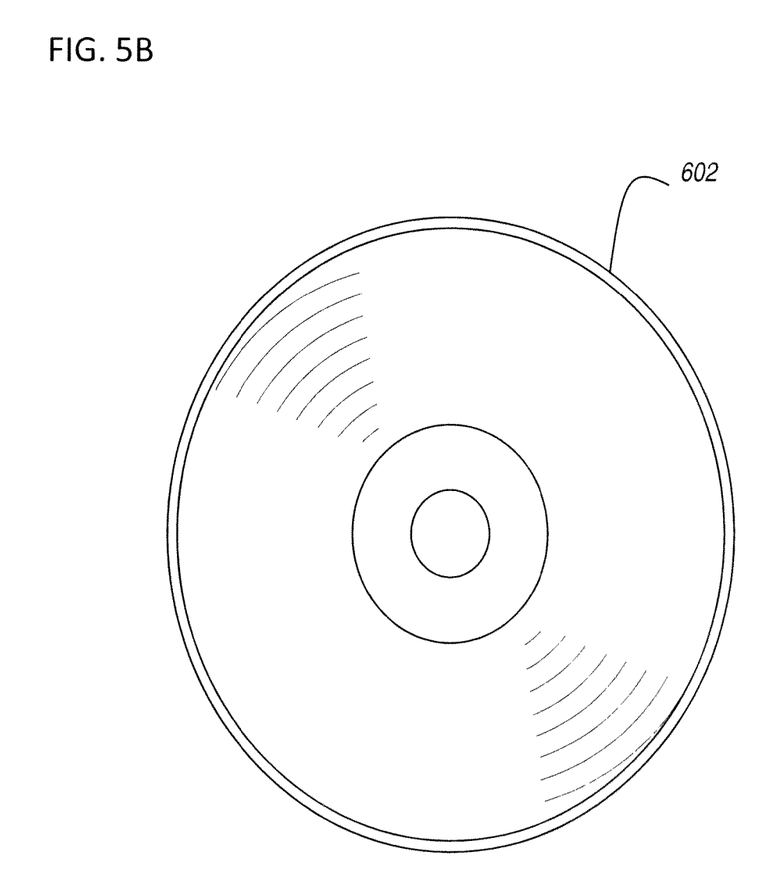

FIG. 5A illustrates a typical hardware configuration 600 which may be used for implementing the system and method of automatically identifying a primary bottleneck in a computer system without any using an user defined parameters. The configuration has preferably at least one processor or central processing unit (CPU) 610. The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, e.g., a computer program product, to execute a sequence of machine-readable instructions. These instructions may reside in various types of storage media.

For example, the computer program product may comprise media, for example hard disks, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

Thus, this aspect of the present invention is directed to a programmed product, including storage media tangibly embodying a program of machine-readable instructions executable by a digital data processor to perform the above method.

Such a method may be implemented, for example, by operating the CPU 610 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 610 and hardware above, to perform the method of the invention.

This storage media may include, for example, a RAM contained within the CPU 610, as represented by the fast-access storage for example. Alternatively, the instructions may be contained in another storage media, such as a magnetic data storage diskette 601 or compact disc 602 (FIG. 5B), directly or indirectly accessible by the CPU 610.

Whether contained in the computer server/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, java, etc.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computer program product for automatically gauging a benefit of a tuning action, the computer program product comprising a computer readable, non-transitory storage medium having computer readable program code embodied therewith, the computer readable program code comprising:

computer readable program code configured to collect a plurality of observations of a running state of a plurality of threads in a computer system;

computer readable program code configured to identify a plurality of resources of the computer system and a capacity of each resource of the plurality of resources;

computer readable program code configured to map an observation of the running state of each thread of the plurality of threads to a resource that the observation of each thread uses, respectively;

computer readable program code configured to apply the tuning action to a first resource of the plurality of resources;

computer readable program code configured to determine an impact on the performance of the computer system based on the applied tuning action; and computer readable program code configured to automatically generate a queuing network model based on the plurality of observations, the plurality of resources of the computer system, and the capacity of each resource of the plurality of resources, wherein the plurality of observations comprises a call stack of a thread.

2. The computer program product according to claim 1, wherein the plurality of observations further comprises lock graph indicating a thread that owns a lock and whether another thread is queued to own the lock.

3. The computer program product according to claim 1, wherein the tuning action applied to the first resource comprises changing a capacity of the first resource.

4. The computer program product according to claim 3, further comprising computer readable program code configured to determine a change in performance when the capacity of first resource is changed.

5. The computer program product according to claim 1, wherein the tuning action applied to the first resource comprises changing a speed of the first resource.

6. The computer program product according to claim 5, further comprising computer readable program code configured to determine a change in performance when the speed of first resource is changed.

7. The computer program product according to claim 1, further comprising computer readable program code configured to apply another tuning action to an observation of the plurality of observations, the another tuning action comprising changing a speed of the observation.

8. The computer program product according to claim 1, wherein the tuning action applied to the first resource increases a number of observations to increase a load of the first resource.

9. The computer program product according to claim 1, wherein the computer program product automatically identifies a primary bottleneck in the computer system without using any user defined parameters, based on the gauged benefit of the tuning action.

10. The-computer program product according to claim 1, wherein the tuning action applied to the first resource comprises a set of tuning actions, the set of tuning actions being prioritized based on a determined impact on the performance of the computer system.

11. The computer program product according to claim 1, wherein said plurality of threads are operating on a Java platform and said plurality of observations is obtained by generating a kill-3signal.

12. The computer product of claim 1, wherein said plurality of observations comprises a plurality of snapshots for call stacks of each currently extant thread.

13. The computer product of claim 12, wherein said plurality of observations further comprises information of monitors indicative of a lock graph showing which threads are awaiting entry into a critical section of code.

14. A computer program product for automatically gauging a benefit of a tuning action, the computer program product comprising a computer readable, non-transitory storage medium having computer readable program code embodied therewith, the computer readable program code comprising:

computer readable program code configured to collect a plurality of observations of a running state of a plurality of threads in a computer system;

computer readable program code configured to identify a plurality of resources of the computer system and a capacity of each resource of the plurality of resources;

computer readable program code configured to map an observation of the running state of each thread of the plurality of threads to a resource that the observation of each thread uses, respectively;

computer readable program code configured to apply the tuning action to a first resource of the plurality of resources to determine an impact on the performance of the computer system; and computer readable program code configured to apply a plurality of tuning actions to the plurality of resources, and computer readable program code configured to determine an impact on the performance of the computer system based on each applied tuning action of the plurality of tuning actions, wherein the plurality of observations comprises a call stack of a thread, and wherein, when a tuning action of the set of tuning actions is determined to be low-priority due to a bottleneck at a second resource downstream of the first resource, another tuning action of the set of tuning actions is chosen to be applied to the first resource.

15. A computer system, comprising:
a processor;
a first module operable to collect, via the processor, information associated with a runtime execution of the computer system;
a second module operable to generate, via the processor, a plurality of queuing network models based on one or more execution states of one or more threads within a program running on the processor, to calculate, via the processor, a plurality of possible tuning actions, and to apply a tuning action of the plurality of tuning actions to the plurality of queuing network models; and
a third module to calculate, via the processor, an expected benefit of the tuning action of the plurality of tuning actions based on an initial placement of tokens in the queuing network model and a placement of tokens in the queuing network model after the tuning action, and to apply the tuning action to a resource of the computer system used by the one or more threads, wherein the expected benefit is further calculated based on a set of tuning actions and a net benefit thereof.

16. The computer system according to claim 15, wherein the first module collects the information associated with the runtime execution of the computer system at periodic intervals.

17. The computer system according to claim 15, wherein the second module is further operable to calculate, via the processor, the set of tuning actions, and to prioritize the set of tuning actions.

18. The computer system according to claim 15, wherein the set of tuning actions are each applied to a first node of the network queuing model, and wherein the second module is further operable to determine if a priority of one or more tuning actions of the set of tuning actions is affected by a second node in the network queuing model.

19. The computer system according to claim 15, wherein the tuning action of the plurality of tuning actions comprises changing a speed of the resource of the computer system.

20. The computer system according to claim 15, wherein the tuning action of the plurality of tuning actions comprises changing a capacity of the resource of the computer system.

21. The computer system according to claim 15, wherein the tuning action of the plurality of tuning actions comprises changing a speed of an observation of the computer system.

22. The computer system according to claim 15, wherein the tuning action of the plurality of tuning actions comprises changing a number of observations of the computer system.

* * * * *